Jan. 1, 1963  R. W. DONALDSON  3,071,656
THIRD RAIL APPARATUS

Filed Nov. 23, 1959  3 Sheets-Sheet 1

INVENTOR.
RAYMOND W. DONALDSON
BY
ATTORNEY

INVENTOR.
RAYMOND W. DONALDSON
BY Kenneth W. Miller
ATTORNEY

Jan. 1, 1963  R. W. DONALDSON  3,071,656
THIRD RAIL APPARATUS

Filed Nov. 23, 1959  3 Sheets-Sheet 3

INVENTOR
RAYMOND W. DONALDSON

BY *Kenneth W. Miller*

ATTORNEY

United States Patent Office 3,071,656
Patented Jan. 1, 1963

3,071,656
THIRD RAIL APPARATUS
Raymond Wesley Donaldson, Mansfield, Ohio, assignor to
The Ohio Brass Company, Mansfield, Ohio, a corporation of New Jersey
Filed Nov. 23, 1959, Ser. No. 854,528
12 Claims. (Cl. 191—32)

This invention relates to conductor supports and, more particularly, to insulating supports for third rails.

This application incorporates matter originally disclosed and claimed in application Serial Number 782,806, filed December 24, 1958, now abandoned, and entitled "Third Rail Apparatus," and is a continuation-in-part thereof.

The principal object of the invention is to reduce the manufacturing costs of supports for third rails.

Another object of the invention is to improve insulating supports for third rails by increasing the strength and durability thereof.

More generally, it is an object of the invention to provide insulating supports for current carrying structural members.

The insulating supports required for the third rails in electric railways and the like must satisfy certain rather severe requirements as to mechanical strength and durability, as well as providing adequate insulation between the rail and the ties or other structure during all kinds of weather. Moreover, these mechanical and electrical requirements present certain economic problems because of the large number of supports required in a railway system.

The present invention, as herein disclosed and described, relates generally to a third rail support which provides improved mechanical and electrical properties and is adapted for production in large quantities at a relatively low cost.

More specifically, the insulating support of the invention comprises a tubular porcelain insulator which is supported upon a metalic base and carries a malleable iron cap at its upper end. The third rail rests upon the cap and is held in insulated relation above the cross tie or other structure and in the proper transverse relation to the running rails.

The base is formed with a center post which extends a substantial distance upward into the interior of the tubular insulator. The center post has a multiply bifurcate upper extremity and is adapted to receive an expander plug for spreading the parts from their normal position. A buffer constituted by an axial ring of resilient material such as rubber is carried on the center post and is so dimensioned that when the parts of the post are spread by the plug the ring is compressed between the parts of the post and the wall of the insulator.

The connection and arrangement of the insulator with the base just described constitutes an important feature of the third rail support, inasmuch as the couple formed by the insulator with the bottom of the base and with the buffer substantially minimizes the effect of transverse forces tending to overturn the insulating support. Such forces ordinarily arise from longitudinal expansion of the third rail due to changes in temperature.

The invention, together with further objects, features and advantages thereof, will be more clearly understood from a reference to the drawings, in which FIG. 1 is an elevation view, partly in section, of a third rail support embodying the invention;

Figure 1:
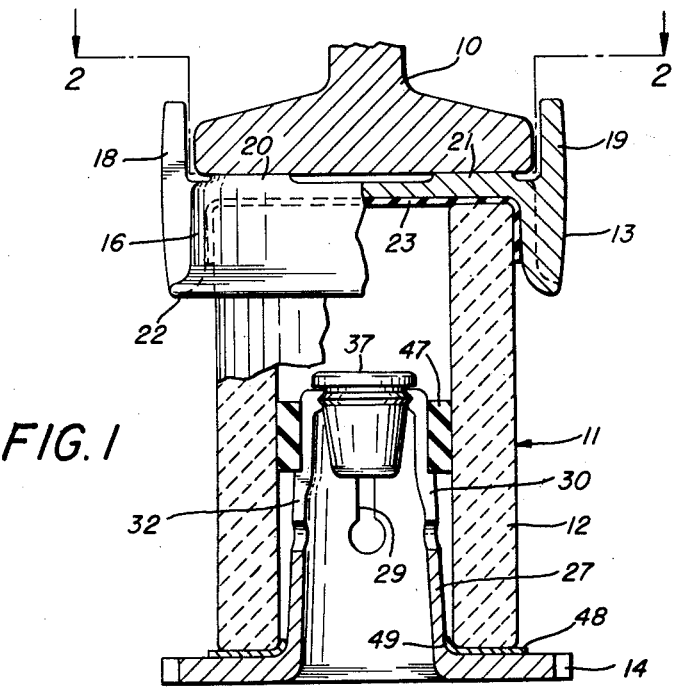

Referring now to FIG. 1, there is shown a third rail apparatus in which a contact rail 10 is carried upon a third rail support indicated generally at 11. The third rail support 11 includes an insulator 12, a cap 13 and a base 14. The rail 10 rests upon the cap 13 and assists in maintaining the cap 13 and insulator 12 in stacked relation upon the base 14. The third rail support carries the rail above and insulated from a tie or other subjacent structure to which the base 14 is secured.

The insulator 12 is a tubular piece of rigid insulating material having the necessary mechanical strength and insulating quality. In order to accomplish the principal object of the invention, the insulator 12 may be suitably constituted by porcelain insulating ware having a glazed interior and exterior finish to prevent absorption of moisture by the body. A wet process porcelain is utilized and the blanks are conveniently formed by extrusion so that manufacturing costs are minimized. The utilization of dry process porcelain, or for that matter of other insulating materials, is deemed to be within the scope of the invention, however, because of the novel arrangement and structure of the parts of the insulating support.

Figure 2:
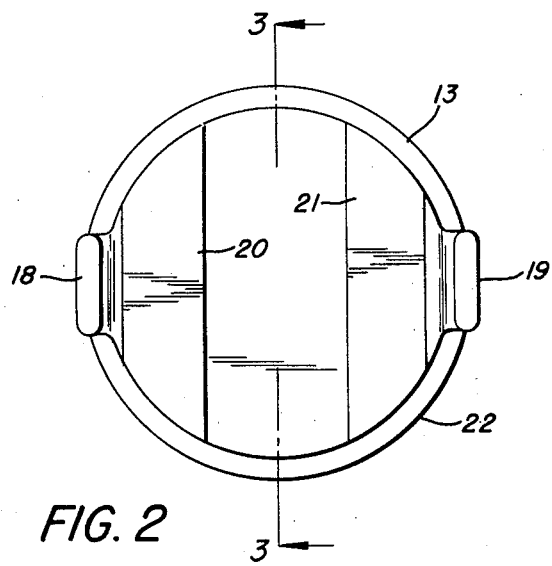
FIG. 2 is a top plan view, taken along the line 2—2, of the third rail support of FIG. 1.
Figure 3:
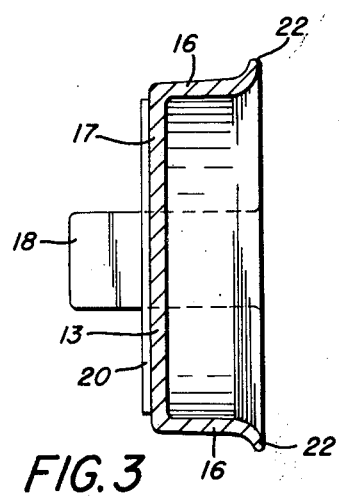
FIG. 3 is a sectional view, taken in the direction 3—3 in FIG. 2, of the cap of the third rail support of FIG. 1.

The cap 13 is more clearly shown in FIGS. 2 and 3 and constitutes a unitary piece conveniently formed as a malleable iron casting. The body of the cap is constituted by a cylindrical side wall 16, a transverse top wall 17 and two axially directed projections 18 and 19 which extend axially beyond the top wall 17. The top wall 17 is formed with two elevated parts or ledges 20 and 21 which carry the rail 10. The side wall 16 extends along the exterior of the tubular member 12 and holds the cap on the member.

As will be evident from FIG. 1, the base of the rail 10 rests upon the ledges 20 and 21 and the projections 18 and 19 act as holders for constraint of the rail against movement in the lateral direction.

As shown, particularly in FIGS. 1 and 3, the lower extremity of the side wall 16 is directed outwardly to form a skirt 22 which acts as a watershed for the insulator 12.

The interior opening constituted by the side wall 16 and the top wall 17 of the cap 13 has a somewhat greater inside diameter than the outside diameter of the insulator 12. A cup-shaped gasket 23 is compressively received between the insulator 12 and the cap 13 and secures the cap 13 in position on the insulator 12, as well as preventing the entry of moisture into the region between the cap and the insulator.

Figure 4:
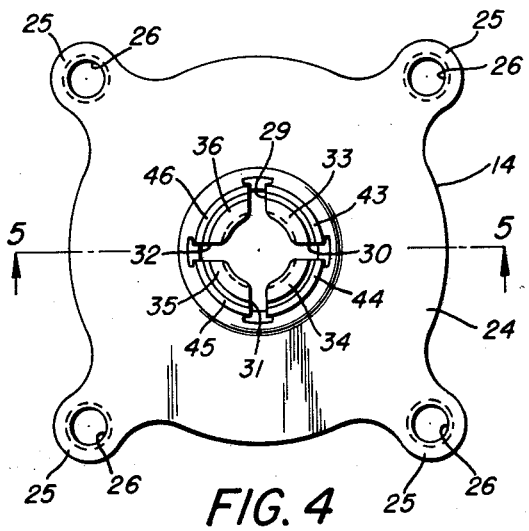
FIG. 4 is a top plan view of the base of the third rail support of FIG. 1.
Figure 5:
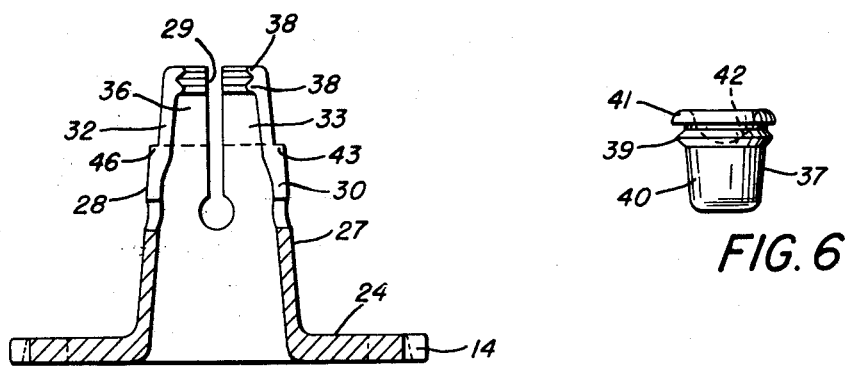
FIG. 5 is an elevation view, partly in section, of the base of FIG. 4.

As is shown, particularly in FIGS. 4 and 5, the base 14 is constituted by a flat, generally circular body 24 having radially extending ears 25 with openings 26 for receiving lag screws or other mounting means. A hollow center post 27 projects from the central part of the body 24 in a generally cylindrical configuration which is somewhat tapered in the direction of the axis of the piece. The center post is integral with the body 24 and the entire base may preferably be formed as a malleable iron casting.

The upper part 28 of the post 27 is bifurcated in two directions by four longitudinally extending slots, designated at 29, 30, 31 and 32, in the wall of the post, to form four separate parts 33, 34, 35 and 36. The separate parts 33 to 36 are sufficiently resilient to receive an expander plug 37 which functions to spread or deform the parts. The parts 33 to 36 are formed at the outward end thereof with inwardly directed projections, e.g., the projections 38 for the part 33.

Figure 6:
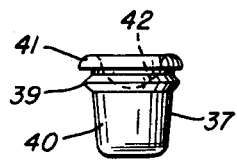
FIG. 6 is an elevation view, partly in section, of the expansion plug for the base.

As is shown in FIG. 6, the expander plug 37 is provided with a laterally projecting ridge 39 which is received in the groove constituted by the projections 38. The plug 37 comprises an integral cast body 40 having a laterally projecting cap 41 and a recess 42 for receiving a driving tool or the like.

Alternately, the parts 33 to 36 may be formed with a single ridge, e.g., the upper one of the ridges 38, and the body 40 of the plug 37 formed with a recess to receive the ridge. This arrangement reduces the extent of elastic movement required in the parts 33 to 36.

Figure 7:
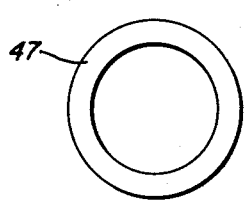
FIG. 7 is a plan view of the buffer shown in section in FIG. 1.

The parts 33 to 36 are formed on the exterior thereof with shoulders 43, 44, 45 and 46 for supporting a buffer 47. As shown in FIGS. 1 and 7, the buffer 47 is an annular piece of substantially cylindrical configuration. The buffer is formed of rubber, or other resilient material, and is compressively received between the center post 27 of the base and the inside wall of the insulator 12 when the expansion plug 37 is positioned between the parts 33 to 36.

As shown in FIG. 1, the insulator 12 rests upon a gasket 48 which is disposed upon the top surface of the body 24 of the base 14. The gasket 48 is formed as a flat annular piece of resilient material, and has the inward portion 49 thereof directed upwardly along the exterior of the lower part of the center post 27. The portion 49 constitutes a buffer for the inner corner of the insulator 12 and prevents chipping of the insulator body which might otherwise take place due to movement of the insulator with respect to the body of the base 14. The gasket 48, together with the gasket 23 and the buffer 47, may be formed of a rubber-like material such as neoprene for best resistance to aging effects.

In order to assemble and install the rail support, the base 14 is first secured to the tie or cross piece by a suitable means. The gasket 48 is then placed over the center post 27 and, with the expansion plug 37 removed, the buffer 47 is positioned over the center post and in engagement with the shoulders 43, 44, 45 and 46. The insulator 12 is then lowered into position over the center post 27 and buffer 47 so that the lower extremity of the insulator rests upon the gasket 48 and is centered over the center post 27. The expander plug 37 is then driven into place between the parts 33 to 36 until the ridge 39 is seated on the parts. The gasket 23 is then placed over the upper end of the insulator 12 and the cap 13 is forced downward into position over the gasket. The insulating support is then ready to receive the rail 10.

It is a feature of the invention that the interior spaces within the insulator 12 between the gasket 23 and the plug 37 and the buffer 47 and between the lower portion of the center post 27 and the buffer 47 are in communication with the external atmosphere through the slots 29 to 32. Accordingly, accumulation of moisture on the interior wall of the insulator and the deterioration of the insulating properties is prevented.

Figure 8:
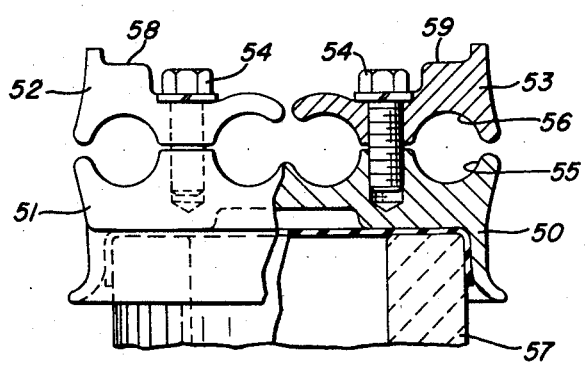
FIG. 8 shows an elevation view of another form of the third rail support, and particularly adapted for carrying feeder cables in shunt with the rail.

There is shown in FIG. 8 an embodiment of the invention in which the cap 50 is arranged to support electrical conductors, e.g., such as cables or bars. The cap 50 includes a body 51 which has two conductor clamps 52 and 53 attached thereto by means of screws 54. The body 51 and the clamps 52 and 53 have appropriately formed longitudinal grooves as, e.g., the grooves 55 and 56, for receiving the conductors. The insulator 57 and base may be constructed as set forth in connection with the description of FIGS. 1 to 7.

The embodiment of FIG. 8 may be utilized for the support of current carrying conductors of various kinds or may advantageously be utilized for supporting a third rail with feeder cables in shunt therewith. To that end the feeder cables are received in the grooves 55 and 56 and the third rail is carried upon the ledges 58 and 59 constituted by the upper portions of the conductor clamps 52 and 53. An arrangement similar to that shown in FIG. 8 may, of course, be utilized when it is desired to clamp the third rail to the cap of the insulating support.

Figure 9:
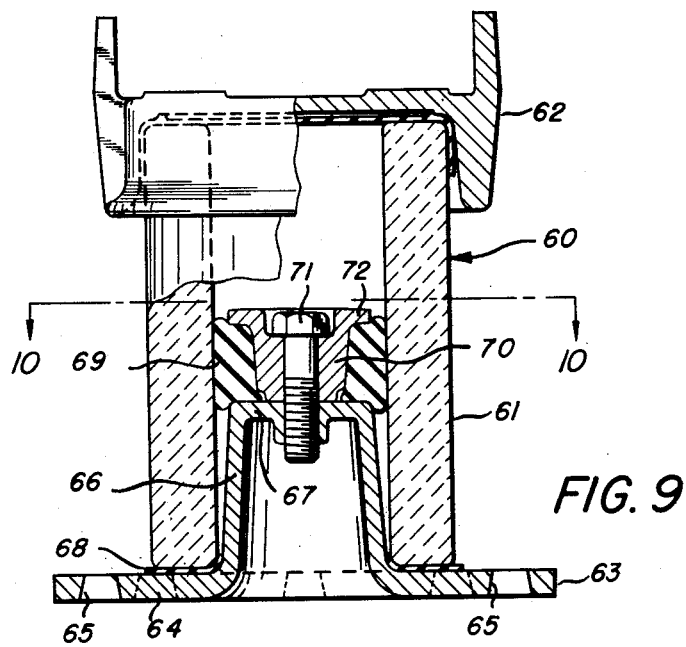
FIG. 9 is an elevation view, partly in section, of another third rail support embodying the invention.
Figure 10:
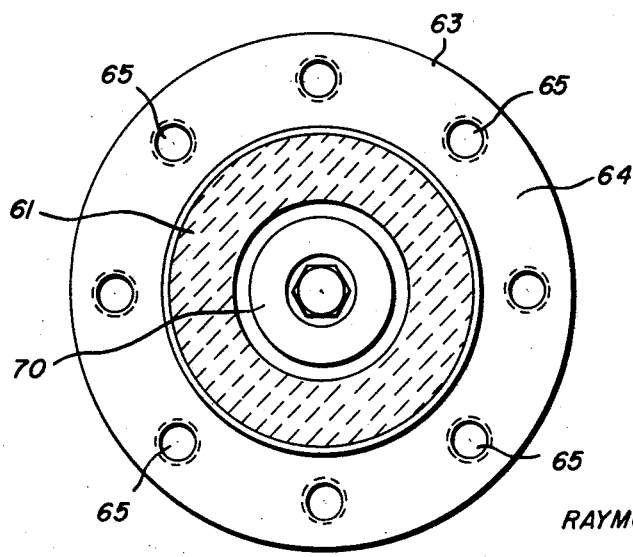
FIG. 10 is a sectional view showing a portion of the third rail support of FIG. 9 and taken in the direction 10—10 in FIG. 9.

The embodiment of the invention shown in FIGS. 9 and 10 comprises an insulating support 60 including an insulator 61, a cap 62 and a base 63. The insulator 61 and the cap 62 may be formed as heretofore set forth in connection with the insulator 12 and the cap 13 of the embodiment of FIG. 1.

The base 63 includes a flat circular body part 64 having a plurality of openings 65 for receiving lag screws or other mounting means. A center post 66 extends upwardly from the center of the body 64 and is formed as a generally cylindrical shell having walls which are slightly tapered in the direction of the cap 62 and having a top wall 67. The insulator 61 is received over the center post 66 and a gasket 68 is interposed between the end of the insulator and the base, as in the embodiment of FIG. 1. The center post 66 carries a buffer 69 which is compressively received over an expander plug 70. The plug 70 is secured to the top wall 67 of the center post 66 by means of a cap screw 71 which extends through the plug 70 into a threaded opening in the wall 67. The expander plug 70 is provided with a radially extending flange 72 at the upper extremity thereof and the buffer 69 is compressed between the flange 72 and the top wall 67 of the center post 66. The buffer 69 is in firm elastic engagement with the inner wall of the insulator 61 when the expander plug 70 is drawn into contact with the top wall 67 of the center post 66. The buffer 69 is formed of rubber or other suitable resilient material and engages the central part of the insulator 61 in order to obtain the advantages described in connection with FIG. 1.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. A third rail insulator comprising a tubular porcelain insulating member having a longitudinal through opening, a base at one extremity of the said insulating member supporting the tubular member at the abutting end thereof, means comprising an integral hollow post extending rigidly from the base longitudinally into the interior of the tubular member in spaced relation to the member, an annular buffer of resilient material carried on the post with expander means expanding the buffer into elastic engagement with the tubular member at a point spaced from the extremities of the tubular member, a gasket of resilient material disposed between the end of the tubular member at the said one extremity thereof and the base, a metal cap supported by the tubular member at the remaining extremity thereof with the cap spaced from the post and buffer in insulated relation thereto and extending across the end of the member with a side wall disposed along the exterior of the member adjacent the extremity thereof for holding the cap on the member, gasket means between the cap and the member including a part between the side wall and the tubular member for securing the cap to the tubular member, and means on the cap for holding a third rail.

2. The invention in accordance with claim 1 in which the annular buffer is received over the end of the post and in which the said expander means comprises a bifurcated extremity of the post and an expander plug received between the parts thereof.

3. The invention in accordance with claim 2 in which the post is bifurcated by slots extending longitudinally thereof below the buffer whereby the slots provide a vapor path between the interior of the tubular member and the interior of the post.

4. The invention in accordance with claim 2 in which the center post has shoulders formed on the exterior of the parts for longitudinally positioning the buffer within the tubular member.

5. The invention in accordance with claim 1 in which the said expander means comprises an expander plug received within the annular buffer, and fastener means for drawing the expander plug to the end of the post with the buffer compressed between the plug and the end of the post.

6. An insulator comprising a tubular member of rigid insulating material having a longitudinal through opening and the walls thereof having straight sides and uniform thickness throughout the length thereof, a base supporting the tubular member at one end thereof and a metal cap supported by the tubular member at the remaining end thereof, the said cap being adapted to carry an electrically conducting part, a post extending rigidly from the base longitudinally into the interior of the tubular member, the adjacent extremity of the tubular member engaging the base about the said post, and means on the post engaged with the tubular member on the interior thereof, spaced from the said one extremity of the tubular member and holding the tubular member against axial and transverse movement with respect to the base, the post and the said means being spaced from the cap in insulated relation thereto.

7. An insulator comprising a tubular porcelain member having a longitudinal through opening and the walls thereof having straight sides and uniform thickness throughout the length thereof, a base supporting the tubular member at one end thereof and a metal cap supported by the tubular member at the remaining end thereof, the said cap being adapted to carry an electrically conducting part, a post extending rigidly from the base longitudinally into the interior of the tubular member, the adjacent extremity of the tubular member engaging the base about the said post, and means on the post engaged with the tubular member on the interior thereof, spaced from the said one extremity of the tubular member and holding the tubular member against axial and transverse movement with respect to the base, the post and the said means being spaced from the cap in insulated relation thereto.

8. An insulator comprising a tubular member of rigid insulating material having a longitudinal through opening and the walls thereof having straight sides and uniform thickness throughout the length thereof, a base supporting the tubular member at one end thereof and a metal cap supported by the tubular member at the remaining end thereof, the said cap being adapted to carry an electrically conducting part, a post extending rigidly from the base longitudinally into the interior of the tubular member, the adjacent extremity of the tubular member engaging the base about the said post, and means comprising an annular piece of resilient material carried by the post and compressively engaged with the tubular member on the interior thereof, spaced from the said one extremity of the tubular member and holding the tubular member against axial and transverse movement with respect to the base, the post and the said means being spaced from the cap in insulated relation thereto.

9. The invention in accordance with claim 8 in which the said insulating member is a unitary tubular piece of porcelain and a flat gasket of resilient material is incorporated between the end of the member at the said one extremity thereof, and the base, to constitute a cushioning means for the insulating member with respect to the base.

10. An insulator in accordance with claim 8, in which the post is a hollow shell having plural longitudinally extending parts at the extremity thereof, the annular piece is received over the end of the post and the parts of the post are spread by an expander plug.

11. An insulator in accordance with claim 8, in which the annular piece is received over an expander plug and fastener means extends between the expander plug and the post and compressing the annular piece between the plug and the end of the post and thereby expanding the piece into engagement with the interior of the tubular member.

12. The insulator in accordance with claim 8, in which the cap has a central part thereof extending across the end of the tubular member and a side part of the cap extending peripherally about the exterior of the member and a gasket of sheet material is received between the central part and side part of the cap and the tubular member and securing the cap to the member.

References Cited in the file of this patent

UNITED STATES PATENTS

| | | |
|---|---|---|
| 619,974 | Martin | Feb. 21, 1899 |
| 717,389 | Gonzebach | Dec. 30, 1902 |
| 808,222 | Stewart | Dec. 26, 1905 |
| 922,544 | Turner et al. | May 25, 1909 |
| 922,951 | Randolph | May 25, 1909 |
| 938,709 | Steinberger | July 20, 1909 |
| 1,532,836 | Schmid et al. | Apr. 7, 1925 |
| 1,868,723 | Boyce | July 26, 1932 |
| 2,106,667 | Thiry | Jan. 25, 1938 |
| 2,179,959 | Schroedter | Nov. 14, 1939 |
| 2,456,480 | Austin | Dec. 14, 1948 |
| 2,502,756 | Schmid | Apr. 4, 1950 |
| 2,947,556 | Wenger | Aug. 2, 1960 |

FOREIGN PATENTS

| | | |
|---|---|---|
| 690,070 | Germany | Oct. 31, 1940 |
| 12,023 | Great Britain | Mar. 22, 1906 |
| 267,156 | Great Britain | Nov. 3, 1927 |